United States Patent Office 3,558,491
Patented Jan. 26, 1971

3,558,491
LUBRICATING OIL COMPOSITIONS
Benjamin T. Fowler, Abingdon, and Eric J. Lewis, Wantage, England, assignors to Esso Research and Engineering Company, a corporation of Delaware
No Drawing. Filed Nov. 15, 1967, Ser. No. 684,900
Claims priority, application Great Britain, Nov. 21, 1966, 52,043/66
Int. Cl. C10m 1/44
U.S. Cl. 252—49.8                      13 Claims

---

ABSTRACT OF THE DISCLOSURE

This invention relates to a process for the preparation of phosphorus-containing di-, tri-, tetra-, and hexa-esters, and complex esters by reaction of carboxylic acid esters with phosphorus containing acid, the resulting phosphorus-containing esters per se, and the use of said phosphorus-containing esters as load-carrying agents for lubricating oils, particularly ester lubricating oils.

---

Esters are used as lubricants especially as aviation lubricants, and it is important that they should have load carrying properties and show stability against oxidation at relatively high temperatures. It has now been found that these esters, and indeed other lubricants, can have improved load-carrying properties by the addition thereto of a minor proportion of a phosphorus-containing ester prepared by the process of the invention. Furthermore the oxidative stability and resistance to corrosion is somewhat improved by the addition of the phosphorus-containing ester.

According to this invention, a phosphorus-containing ester (which preferably has no free hydroxyl groups) is prepared by a process wherein either (a) an ester is reacted with at least 0.3 mole per mole, of an ester of a phosphorus containing acid; or (b) a compound from which the desired ester is derived and having two or more free hydroxy groups is reacted with at least 0.3 mole per mole, of an ester of a phosphorus-containing acid and thereafter with the other compound or compounds necessary to complete the desired ester.

In a modification of method (b) said compound having two or more free hydroxy compounds is first reacted with a compound which protects one or more of the free hydroxy groups but leaves one or more hydroxyl groups unprotected, before said compound thus protected is reacted with the phosphorus compound, and thereafter the protecting groups are removed before reaction takes place with the compound or compounds necessary to complete the desired ester.

Thus, by the process of the invention phosphorus-containing di-, tri-, tetra-, or hexa-esters or complex esters can be prepared. As used in this specification the term "complex ester" means an ester derived from the reaction of at least three different compounds, each compound having at least one carboxylic or hydroxyl group, wherein at least one of said three different compounds contains two or more carboxyl groups, and another of said three different compounds contains two or more hydroxyl groups. Such complex esters may be esters wherein there are free hydroxyl or carboxyl groups.

Suitable compounds from which the esters of the invention are derived include mono- and poly-carboxylic acids or ether acids; monohydric and polyhydric alcohols, and polyol ethers. Examples of such compounds are as follows:

MONOCARBOXYLIC ACIDS

Straight chains acids such as n-butanoic acid, caproic acid, caprylic acid, pelargonic acid, capric acid, and other acids having between for example 2 and 20 carbon atoms per molecule.

Branched chain acids of the general formula:

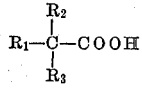

wherein $R_1$, $R_2$ and $R_3$ are similar or dissimilar hydrocarbyl, (especially alkyl) groups or hydrogen atoms provided that not all three groups are hydrogen atoms. It is preferable if only $R_1$ is an alkyl group, $R_2$ and $R_3$ being hydrogen. Such acids include α,α dimethyl valeric acid, α,α dimethyl capric acid, α,α dimethyl octanoic acid and many other acids having between for example 4 and 40 carbon atoms per molecule.

DICARBOXYLIC ACIDS

These include straight chain aliphatic or aromatic acids for example, succinic acid, adipic, pimelic acid, azelaic acid, sebacic acid and many other acids having between for example 2 and 20 carbon atoms per molecule.

Also suitable are branched chain di-carboxylic acids of the general formulae:

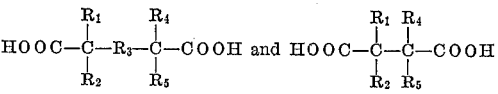

where $R_3$ is an alkylene or hydrocarbyl substituted alkylene group, and $R_1$, $R_2$, $R_4$ and $R_5$ are similar or dissimilar hydrocaryl groups (especially alkyl groups) or hydrogen atoms provided that not all four groups are hydrogen atoms. Examples of branched-chain dicarboxylic acids are tetra alkyl substituted adipic, pimelic, azelaic and sebacic acids wherein the alkyl groups are methyl, ethyl, isopropyl or butyl groups, for instance α,α,α′,α′, tetra methyl azelaic acid, or α,α,α′,α′ tetra methyl pimelic acid and many other acids containing for example between 6 and 60 atoms per molecule.

POLYCARBOXYLIC ACIDS

Acids having three or more carboxylic acids, e.g. propane tricarboxylic acid, may be used if desired but they are not the preferred acids.

ETHER-ACIDS

Methyl, ethyl, and butyl ethers of glycollic acid or diglycollic acid or ethylene diglycollic acid; or the ethyl and butyl ethers of 2-hydroxy-ethoxy-acetic acids; and

and

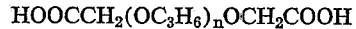

where $n$ is an integer.

MONOHYDRIC ALCOHOLS

These include straight-chain alcohols, for example, n-hexanol, n-dodecanol, and other monohydric alcohols having for example 1 to 20 carbon atoms per molecule.

Branched chain monohydric alcohols include those of the general formula

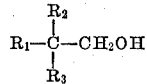

wherein $R_1$, $R_2$ and $R_3$ are hydrocarbyl (especially alkyl) groups or H atoms provided that they cannot all be H atoms.

Examples of branched chain monohydric alcohols are 2,2,4-trimethyl pentan-1-ol; 2,2, dimethyl hexan-1-ol; 2,2 dimethyl octan-1-ol; 1-methyl cyclohexyl methan-1-ol, and many others containing for example between 3 and 40 carbon atoms per molecule.

GLYCOLS

Straight-chain glycols, such as ethylene glycol, propylene glycol and hexylene glycol or the polyethylene or polypropylene glycols of molecular weight between 150 and 250 may be used.

It is preferable however if branched chain glycols be used, for example those containing between 3 and 40 carbon atoms per molecule, for instance 2,2-dimethyl propane-1,3-diol (i.e. neopentyl glycol); 2-ethyl 2-butyl-propane-1,3-diol; 2,2-diethyl propane-1,3-diol; 2-methyl-2-propyl propane-1,3-diol.

OTHER POLYOLS

Triols, tetrols or higher polyols may be used and these include for example trimethylol ethane, trimethylolpropane, pentaerythritol, and di-pentaerythritol.

POLYOL ETHERS

Partial ethers of polyols, i.e. ethers having at least one free hydroxyl group, may be used. These include the short chain alkyl ethers of glycols, for example mono-n-butyl ethylene glycol, mono isopropyl hexylene glycol, as well as the mono ethers of polyalkylene glycols, e.g. the mono methyl, ethyl or propyl ethers or polyethylene glycol.

The esters of this invention may be derived from hindered alcohols or hindered carboxylic acids or both. By "hindered alcohol" we mean an alcohol where there are no hydrogen atoms attached to the carbon atom beta to the hydroxyl group, and by a "hindered carboxylic acid" we mean a carboxylic acid where there are no hydrogen atoms attached to the carbon atom alpha to the carboxyl group. If the esters are derived from hindered alcohols or hindered carboxylic acids, such esters will have greater thermal stability than if they are not derived from such alcohols or carboxylic acids.

The ester of a phosphorus containing acid (hereinafter referred to as the phosphorus compound) may be an ester of phosphoric acid or phosphorus acid. The particularly preferred phosphorus compounds are the partial or complete esters of phosphoric acid having the general formula

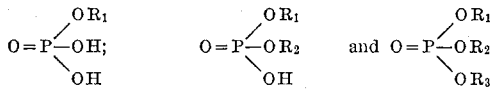

wherein $R_1$, $R_2$ and $R_3$ are similar or dissimilar hydrocarbyl groups. Preferably these hydrocarbyl groups contain between 1 and 10 carbon atoms, and preferably the hydrocarbyl groups are alkyl groups, e.g. ethyl, isopropyl, n-butyl, n-hexyl and n-decyl groups. If desired however other hydrocarbyl groups, e.g. aryl groups such as phenyl or cresyl groups, may be present instead of or as well as alkyl groups. Alternatively one or more of the OH groups may be replaced by a halogen atom to give phosphonate, e.g. an alkyl halogen phosphonate. These have the formulae:

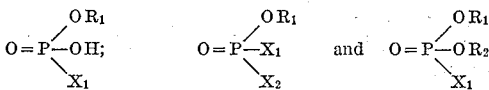

wherein $R_1$ and $R_2$ are similar or dissimilar hydrocarbyl groups and $X_1$ and $X_2$ are similar or dissimilar halogen atoms. The particularly preferred phosphorus compound are tri-butyl phosphate and dibutyl chlorophosphonate.

The term "complex ester" covers a wide range of esters, but it preferable if complex esters are derived either from the reaction of a compound containing two carboxyl groups, a compound containing two hydroxyl groups, and a compound containing one carboxyl group i.e. an acid-centred complex ester, or from the reaction of a compound containing two hydroxyl groups, a compound containing two carboxyl groups, and a compound containing one hydroxyl group i.e. a glycol-centered complex ester.

Preferably the complex ester will have a total of between 15 and 80 e.g. between 20 and 65 carbon atoms per molecule. A preferred complex ester is that derived from adipic acid, neopentyl glycol, and caproic acid.

In preparing the complex esters in accordance with process (a) of the invention, the reactants are reacted together in substantially stoichiometric proportions according to the ester it is desired to prepare. Thus, for esters of the general formula:

$$R-DA-G-DA-R_1$$

where R and $R_1$ are residues of similar or dissimilar alcohols or glycol ethers, DA is the residue of a dicarboxylic acid and G is the residue of a glycol, substantially two moles of dicarboxylic acid per mole of glycol, and per mole of each of the alcohol or glycol ethers are reacted together in one or two stages. Similarly for esters of the general formula:

$$M-G-DA-G-M_1$$

where M and $M_1$ are residues of similar or dissimilar monocarboxylic acids, and G and DA are as defined above, substantially two moles glycol per mole of dicarboxylic acid, and per mole of each of the monocarboxylic acids are reacted together in one or two stages.

For esters of the general formula:

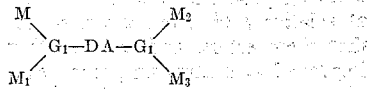

where $M_2$ and $M_3$ are residues of similar or dissimilar monocarboxylic acids, $G_1$ is a triol and M, $M_1$ and DA are as defined above, substantially two moles of triol per mole of dicarboxylic acid and per mole of each of the mono-carboxylic acids are reacted together in one or two stages.

In preparing the phosphorus-containing complex esters by process (a), the complex esters are prepared by conventional methods using one or more stages. If desired, an esterification catalyst may be used, and its use often results in a substantial reduction in reaction time, but the ester is often less thermally stable. Examples of esterification catalysts are para toluene sulphonic acid and sodium bisulphate.

The complex ester is then further reacted with the phosphorus compound under conditions which produce ester interchange with the elimination of a lower boiling point ester. If desired a catalyst, e.g. sodium methoxide, may be used. Although at least 0.3 mole of phosphorus compound per mole of complex ester must be used, the preferred quantity is between 1 and 2 moles, e.g. 1.5 moles, per mole of the complex ester.

Thus for an acid-centred complex ester:

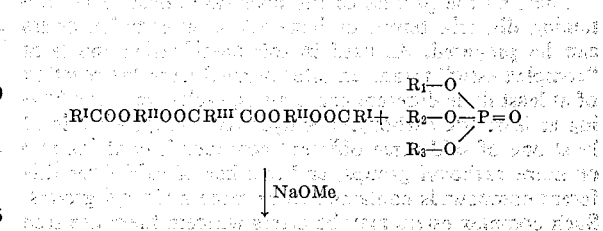

Where in the above and following formulae $R^I$, $R^{II}$, $R^{III}$, $R^{IV}$, $R^V$, $R^{VI}$, $R^{VII}$, $R^{VIII}$, $R_1$, $R_2$ and $R_3$ represent similar or dissimilar hydrocarbyl groups.

Similarly for a glycol centred complex ester

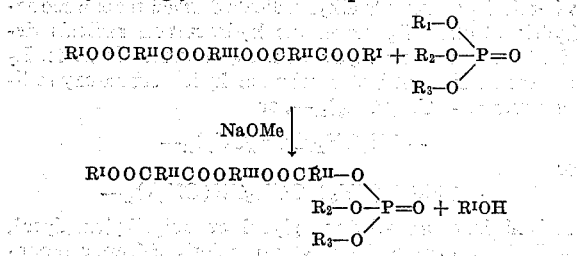

By altering the reactant mole ratios, $R_2$ and/or $R_3$ may also be exchanged for the complex ester radical. Similarly the acid radicals at either end of the complex ester may be replaced by phosphorus-containing groups.

During the preparation of complex ester a certain amount of diester and "super complex ester" is formed, and both these may also undergo ester interchange with the phosphorus compound e.g.

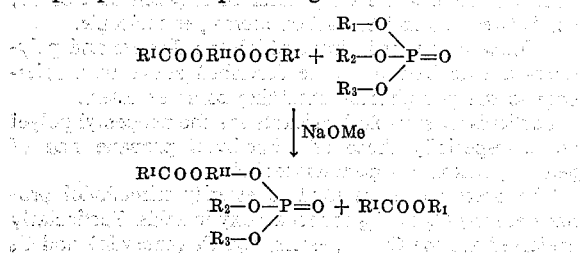

Similarly super complex esters will react to form

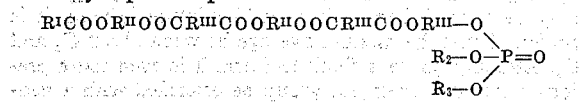

The process (a) can be readily applied to the preparation of di-, tri-, tetra-, and hexa-esters containing phosphorus. In this case also transesterification occurs with the elimination of a lower boiling point ester. Thus:

TRIESTERS

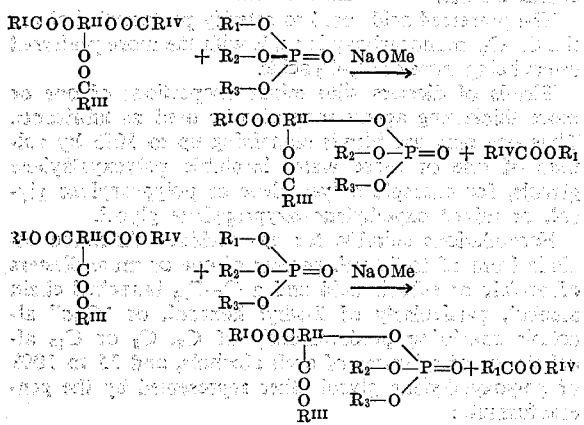

TETRAESTERS

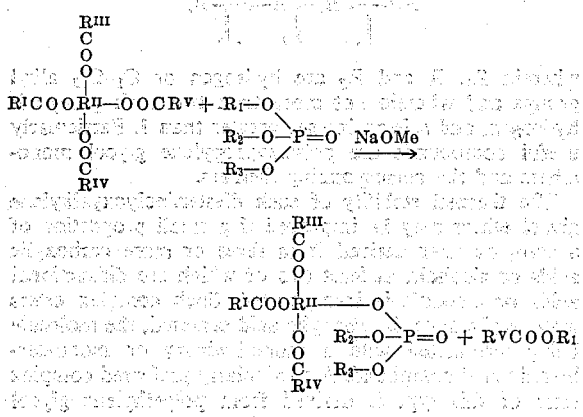

HEXAESTERS

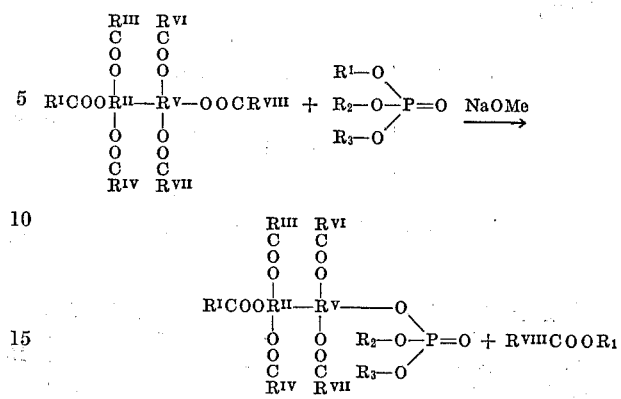

Since the esters of the invention involve the transesterification of multifunctional products the final compounds may be monomeric or polymeric in nature. The invention also contemplates mixtures of monomers or polymers or both.

As with complex esters, the preferred quantity of phosphorus compound is between 1 and 2 moles, e.g. 1.5 moles, per mole of ester, and a catalyst such as sodium methoxide may be used.

To prepare phosphorus-containing complex esters by process (b) of the invention any of the reactants or intermediates from which the complex ester is derived provided it has two or more free hydroxyl groups, may be reacted with the phosphorus compound. The reaction takes place under conditions which produce ester interchange with the elimination of alkanol. If desired a catalyst, for example sodium methoxide, may be used. The amount of phosphorus compound which must be at least 0.3 mole per mole of compound having two or more free hydroxyl groups is preferably between 1 and 2, e.g. 1.5 moles, per mole of compound having two or more free hydroxyl groups.

Thus,

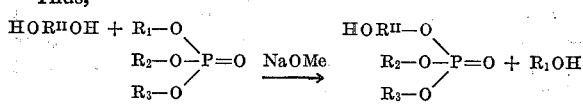

The remaining free hydroxyl group or groups in the compound thus obtained are reacted further with the necessary combination of monohydric, and polyhydric alcohols, monobasic and polybasic acids to form the required complex ester terminated with phosphorus-containing group.

Thus,

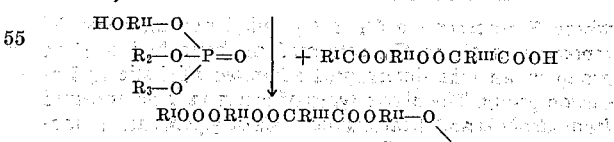

The preparation of phosphorus-containing di-, tri-, tetra- and hexa-esters by process (b) is similar to that described above for complex esters except that in the last stage of the reaction the compound obtained in the first stage of the reaction will only be reacted with an acid or a mixture of acids.

If in processes (a) and (b) a phosphonate, e.g. an alkyl halogen phosphonate, is used as the phosphorus compound, the ester or intermediate must contain at least one hydroxyl group. During such a reaction a hydrogen halide will be removed, so it is preferable in such cases to carry out the reaction in the presence of a neutralising agent, for example pyridine.

Thus,

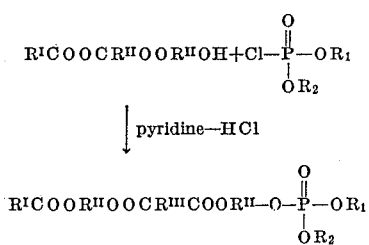

In the modification of process (b) the compound which protects one or more free hydroxyl groups may for example be a partial ester such as a monoester or a dicarboxylic acid, e.g. mono methyl ester of fumaric acid to protect one hydroxyl group. To protect two hydroxyl groups the compound may for example be a ketone, e.g. methyl ethyl ketone or an anhydride where acid groupings are required.

To remove the protecting groups after reaction with the phosphorus compound, the protected compound may for example be subjected to mild acid hydrolysis, e.g. by heating in the presence of water and p-toluene sulphonic acid; or by heating in the presence of water and sodium bisulphate.

In processes (a), (b) and its modification after the reaction is complete the ester is recovered from the reaction mixture (one- or two-stage processes) e.g. by stripping under nitrogen. The recovered ester may also be washed, especially with basic inorganic reagents to reduce the acidity of the ester. The ester thus obtained will be substantially free of hydroxyl groups.

The phosphorus-containing esters are added in minor proportion by weight to a lubricating oil, e.g. from 0.001 to 10% by weight, especially from 0.1 to 5% by weight.

If desired the lubricating oil composition may also contain a minor proportion by weight, e.g. between 0.1 and 1% (for instance 0.5%) by weight based on the weight of the composition of a dihydrocarbyl acid phosphite. Suitable dihydrocarbyl acid phosphites are dialkyl acid phosphites, especially those whereon each alkyl group contains less than 10 carbon atoms, e.g. dibutyl acid phosphite.

The lubricating oil may be a synthetic lubricating oil or any animal, vegetable, or mineral oil, for example petroleum oil fractions ranging from naphthas to spindle oil to SAE 30, 40 or 50 lubricating oil grades, castor oil, fish oils, oxidised mineral oil.

Suitable diesters, particularly for aircrafts lubrication, are diesters of the general formulae ROOCR$^I$COOR and RCOOR$^I$OOCR where R represents a $C_6$ to $C_{10}$ alkyl radical, while R$^I$ represents a $C_4$ to $C_{10}$ saturated aliphatic hydrocarbon group or an ether-interrupted saturated aliphatic hydrocarbon group. The above types of esters may be prepared from alcohols and dicarboxylic acids or glycols and monocarboxylic acids.

Another suitable class of lubricant are the polyesters which are prepared by reacting polyhydric alcohols such as trimethylolpropane, pentaerythritol and di-pentaerythritol with monocarboxylic acids such as butyric acid, caproic acid, caprylic acid and pelargonic acid to give the corresponding tri- or tetraesters.

The complex esters which may be used as base oils are formed by esterification reactions between a dicarboxylic acid, a glycol and an alcohol and/or a monocarboxylic acid. These esters may be represented by the following formulae:

wherein $R_1$ represents alkyl radicals derived from a monohydric alcohol, $R_2$ represents hydrocarbon radicals derived from a dicarboxylic acid, e.g. alkanedioic acids, $R_3$ represents divalent hydrocarbon or hydrocarbon-oxy radicals such as —$CH_2(CH_2)_n$—, or —$CH_2CH_2(OCH_2CH_2)_n$— or

—$CH_2CH(CH_3)(OCH_2CH(CH_3))_n$— derived from an alkylene glycol or polyalkyleneglycol, while $R_4$ represents the alkyl group derived from a monocarboxylic acid. $n$ in the complex ester molecule which is an integer will usually range from 1 to 6 depending upon the product viscosity desired which is controlled by the relative molar ratio of the glycol or polyglycol to the dicarboxylic acid. In preparing the complex ester, there will always be some simple ester formed, i.e. $n=0$, but this will generally be a minor portion. In general these complex esters will have a total of between 15 and 80, e.g. between 20 and 65 carbon atoms per molecule.

Suitable compounds from which the diesters and polyesters are derived are those described above with reference to the phosphorus-containing complex esters.

Particularly suitable lubricants are the neopentyl polyol esters, especially those of trimethylol propane and of pentaerythritol, or dipentaerythritol.

The preferred acids used to esterify trimethylol propane are the $C_5$ to $C_{12}$ monocarboxylic acids. Particularly preferred are the $C_7$–$C_{10}$ esters, e.g. $C_8$ (caprylic) and $C_9$ (pelargonic) acid esters. Mixtures of these $C_7$–$C_{12}$ acids may be used. When such an acid mixture is used, it is preferred that the mixture average between about $C_8$ and $C_9$. Although more difficult to form, it is even more preferred that one methylol group be esterified with a neoheptanoic acid, e.g. 2,2-dimethylpentanoic acid, and the remaining methylol groups esterified with non-hindered acids, e.g. pelargonic acid. This particular ester is substantally as thermally stable as the completely hindered ester, but has superior volatility and low temperature characteristics.

The preferred acids used to esterify pentaerythritol are the $C_4$–$C_{10}$ monocarboxylic acids with the more preferred esters being those of $C_6$–$C_7$ acids.

Blends of diesters with minor proportions of one or more thickening agents may also be used as lubricants. Thus one may use blends containing up to 50% by volume of one or more water insoluble polyoxyalkylene glycols, for example polyethylene or polypropylene glycol, or mixed oxyethylene/oxypropylene glycol.

Formulations suitable for gas turbine lubrication include from 65 to 90 vol. percent of one or more diesters of azelaic or sebacic acid and a $C_6$–$C_{16}$ branched chain alcohol, particularly of 2-ethyl hexanol, or "Oxo" alcohols consisting predominantly of $C_8$, $C_9$ or $C_{10}$ alcohols, or of mixtures of such alcohols, and 35 to 10% of polyoxyalkylene glycol ether represented by the general formula:

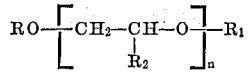

wherein $R_1$, R and $R_2$ are hydrogen or $C_1$–$C_{12}$ alkyl groups and wherein not more than two such groups is hydrogen, and $n$ is an integer greater than 1. Particularly useful compounds are polyoxypropylene glycol monoethers and the corresponding diethers.

The thermal stability of such diester/polyoxyalkylene glycol ethers may be improved if a small proportion of a complex ester derived from three or more carboxylic acids or alcohols, at least two of which are difunctional acids or alcohols is incorporated. Such complex esters may be glycol or dicarboxylic acid centered, the molecule being terminated with a mono-hydroxy or mono-carboxylic acid compound. A particularly preferred complex ester of this type is derived from polyethylene glycol of molecular weight 200, 2 molecules of sebacic or azelaic acid, and 2 molecules of a $C_6$–$C_{10}$ branched chain aliphatic monohydric alcohol, particularly 2-ethyl hexanol.

The invention is now described with reference to the following examples.

EXAMPLE I

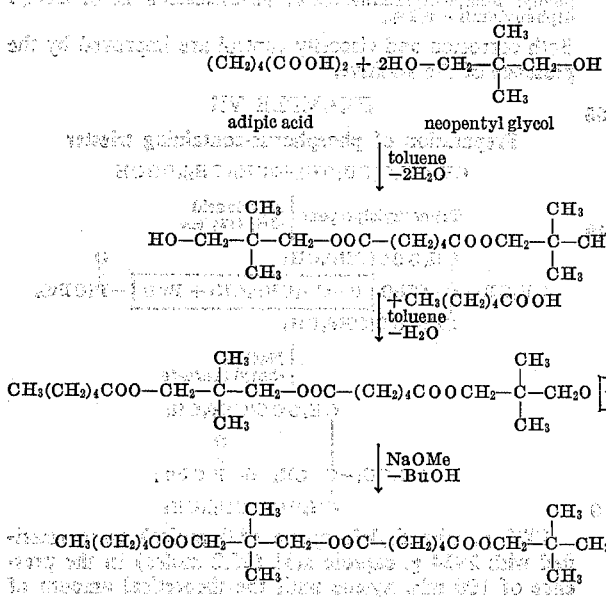

732 g. adipic acid (5 moles) were esterified under nitrogen with 1041 g. neopentyl glycol (10 moles) in a 3 litre flask fitted with a Dean and Stark head using 350 mls. toluene as a water entrainer. The theoretical amount of water (180 mls.) was obtained in 6½ hours with a maximum reaction temperature of 160° C.

580 g. n-caproic acid (5 moles) were added and the esterification continued for a further 5 hours with the removal of 90 mls. water to form the $C_6$ half ester. The product was heated with stirring with 1500 mls. of 5% sodium carbonate solution to 140° F. and allowed to separate overnight. The top layer was stripped under vacuum (1 mm. Hg) to 170° C. resulting in a yield of 1716 g. (82.5%) of the $C_6$ half-ester.

832 g. $C_6$ half ester (2.0 moles) was heated with 798 g. tributyl phosphate (3 moles) and 7 g. sodium methoxide under a nitrogen blanket. The transesterification was continued until the theoretical amount of distillate was obtained (148 g.). Maximum reaction temperature was 245° C. with a head temperature of 164° C. The mixture was washed with 8% sodium carbonate solution followed by 1% sodium carbonate and stripped under 2 mm. Hg vacuum to 160° C. After charcoal filtration a final yield of 971 g. was obtained (79.8%).

EXAMPLE II

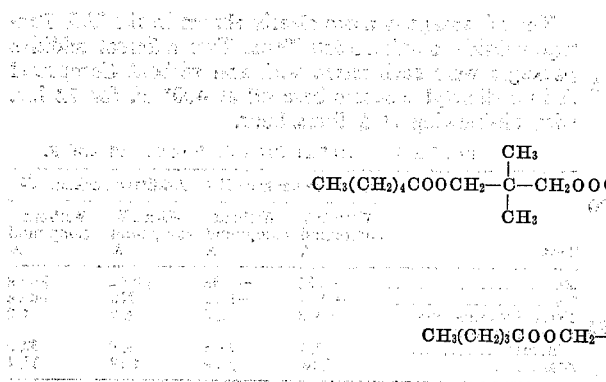

438 g. adipic acid (3.0 moles), 625 g. neopentyl glycol (6.0 moles) and 767 g. of caproic acid (6.6 moles) were esterified in the presence of 200 mls. toluene water entrainer until the theoretical amount of water was removed (216 mls.). The product was stripped at 180° C. under vacuum (1 mm.) and washed with 1 litre of 5% sodium carbonate solution containing isopropyl alcohol to break the emulsion, followed by 1 litre of 0.5% sodium carbonate solution. After a final vacuum strip (2 mm. Hg) the $C_6$ complex ester was charcoal filtered. Yield 925 g. (60.0%).

2056 g. $C_6$ complex ester (4.0 g. moles) and 2128 g. tributyl phosphate were heated together with 12 g. sodium methoxide at 205–250° C. until 688 g. distillate were obtained. The product was washed with sodium carbonate solution and stripped at 175° C. under 1 mm. Hg vacuum followed by charcoal filtration. Yield 1970 g. (81.0%).

EXAMPLE III

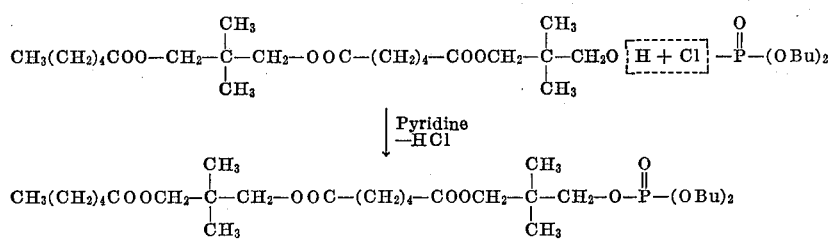

The $C_6$ half-ester was prepared as in Example I.

503 g. dibutyl chlorophosphonate (2.1 moles) in 500 mls. dry carbon tetrachloride were added dropwise to 832 g. $C_6$ half-ester (2.0 moles) in 500 mls. dry chloroform and 500 mls. pyridine at such a rate that the temperature was maintained below 35° C. During the addition solid pyridine hydrochloride separated. The reaction was heated under reflux (reaction temperature 90° C.) for 0.5 hour and then allowed to cool overnight.

The product was washed successively with 1 litre N hydrochloric acid, 1 litre of 0.8% sodium carbonate solution, stripped at 175° C. under vacuum (1 mm. Hg) and charcoal filtered. Yield 980 g. (80.5%).

EXAMPLE IV

The greatly increased load-carrying effected by the products of Examples I to III (hereinafter referred to as Compound A) is shown by IAE Gear Machine Tests using Hercolube A* as a reference base oil.

TABLE 1

| | IAE gear machine failure loads, pounds at 200° C., 1 pint minute— | |
|---|---|---|
| | 2,000 r.p.m. | 6,000 r.p.m. |
| Hercolube A | 29 | <10 |
| Hercoluble A plus 1% compound A | 52.9 | 11.25 |
| Hercoluble A plus 1% compound A plus Dimac S | 58 | 12.5 |

It may be seen that the presence of "Dimac S," a linoleic acid dimer, raises the load-carrying still further.

EXAMPLE V

A further example of increased load carrying effected by Compound A is shown by IAE Gear Machine Test Results using a base oil consisting of 75% trimethylolpropane triperlargonate and 25% of a complex ester prepared by esterifying 1 mole polyethylene glycol 200 with 2 moles azelaic acid and 2 moles of 2-ethyl hexanol.

TABLE 2

| | IAE gear machine [1] |
|---|---|
| 75% triester/25% complex ester | 12.5 |
| 75% triester plus 1% compound A | 19.4 |
| 75% triester plus 1% compound A plus 0.05% dibutyl acid phosphite | 32.5 |

[1] Failure loads, pounds at 200° C., 1 pint/min. and 6,000 r.p.m. It will be noted that the load carrying is still further enhanced by dialkyl acid phosphite.

EXAMPLE VI

Rolls Royce Oxidation Tests were carried out on Hercolube A with and without Compound A. An improvement in oxidative stability was obtained.

TABLE 3.—OXIDATION TEST AT 225° C.

| | KVcs 210° F. percent increase after— | |
|---|---|---|
| | 45 hours | 52 hours |
| Hercolube A | 374 | 423 |
| Hercolube A plus 1% compound A | 268 | 324 |

* Hercolube A is a tetra ester obtained by esterifying pentaerythritol with monobasic acids of an average chain length of between 5 and 7 carbon atoms.

The advantage is more clearly shown in the U.S. Pentagon Oxidation-Corrosion Tests. Two different additive packages were each tested with and without Compound A in a di-octyl sebacate base oil at 400° F. for 72 hrs. with air-blowing at 5 litres/hour.

TABLE 4.—PENTAGON CCS TESTS AT 400° F.

| | Additive package X [1] | | Additive package Y [2] | |
|---|---|---|---|---|
| Test | With 1% compound A | Without compound A | With 1% compound A | Without compound A |
| Mg | −0.36 | −1.38 | +0.02 | +0.08 |
| Cu | +0.01 | −1.21 | Nil | +0.08 |
| Percent volume loss | 4.3 | 7.7 | 4.2 | 4.2 |
| Percent viscosity increase | 16.1 | 24.8 | 9.9 | 32.0 |
| Δtan | 5.58 | 8.89 | 4.39 | 15.1 |

[1] Salicyclal amino guanidine myristic acid salt 0.075%, phenyl β-naphthylamine 0.4%, dioctyl diphenylamine 2.5%.
[2] Salicylal amino guanidine myristic acid salt 0.075%, phenyl β-naphthylamine 0.2%, phenothiazine 0.3%, dioctyl diphenylamine 0.9%.

Both corrosion and viscosity control are improved by the presence of the additive.

EXAMPLE VII

Preparation of phosphorus-containing triester $$CH_3CH_2C(CH_2OH)_3 + 3CH_3(CH_2)_4COOH$$

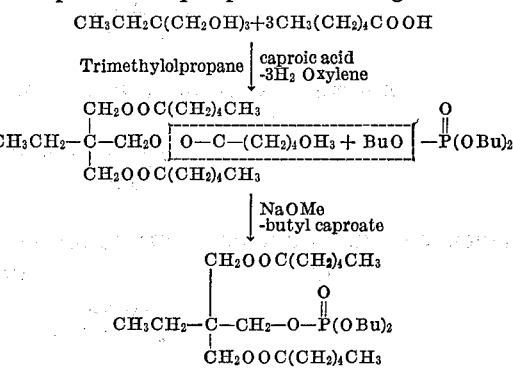

1072 g. trimethylolpropane (8.0 moles) were esterified with 2924 g. caproic acid (25.2 moles) in the presence of 100 mls. xylene until the theoretical amount of water was removed (432 mls.). The product was stripped at 180° C. under vacuum (1 mm. Hg) and washed with 1 litre 8% sodium carbonate solution containing 300 mls. isopropyl alcohol to break the emulsion, followed by 1 litre of 0.5% sodium carbonate solution. After a final vacuum strip the $C_6$ triester was charcoalfiltered. Yield 3000 g. (87.6%).

2140 g. $C_6$ triester (5.0 moles) and 1996 g. tributyl phosphate (7.5 moles) were heated together with 15 g. sodium methoxide at 205–250° C. until 900 g. distillate were obtained. The product was washed successively with 2 litres N hydrochoric acid, 2 litres 8% sodium carbonate solution and finally 2 litres 0.8% sodium carbonate solution. After stripping at 175° C. under vacuum (1 mm. Hg), the product was charcoal filtered. Yield 1560 g. (59.8%).

EXAMPLE VIII

The greatly increased load carrying effected by the product from Example VII (hereinafter referred to as Compound B) is shown by IAE Gear Machine Test Results using a triester/complex ester base oil.

TABLE 5

IAE gear machine failure loads, lbs. at 200° C., 1 pint/min. at 6000 r.p.m.

| | |
|---|---|
| 75% triester/25% complex ester (as in Example V) | 12.5 |
| 75% triester/25% complex ester +1% Compound B | 37 |

EXAMPLE IX

Rolls Royce Oxidation Tests were carried out on various base oils with and without Compound B. An improvement in oxidative stability was obtained.

TABLE VI.—OXIDATION TEST AT 225° C.

| Ester | KVΔs 210° F. | | inc. after mg.KOH/g., hours | | Δtan | |
|---|---|---|---|---|---|---|
| | 25 | 52 | 69 | 45 | 52 | 69 |
| Acid centred complex ester | 273 | 356 | | 14.8 | | 15.3 |
| Acid centred plus compound B | 204 | 257 | | 10.8 | | 10.6 |
| Hercolube F [1] | 319 | 428 | | 5.50 | 5.69 | |
| Hercolube F [1] plus compound B | 240 | 265 | | 4.07 | 3.77 | |
| $C_8$ triester plus compound B | 255 | 252 | 417 | 11.3 | 11.2 | 11.2 |
| $C_8$ triester plus compound B | 143 | 164 | 207 | 8.14 | 7.94 | 7.73 |

[1] Hercolube F is a hexaester obtained by esterifying dipentaerythritol with monobasic acids of an average chain length of between 5 and 7 carbons atoms.

EXAMPLE X

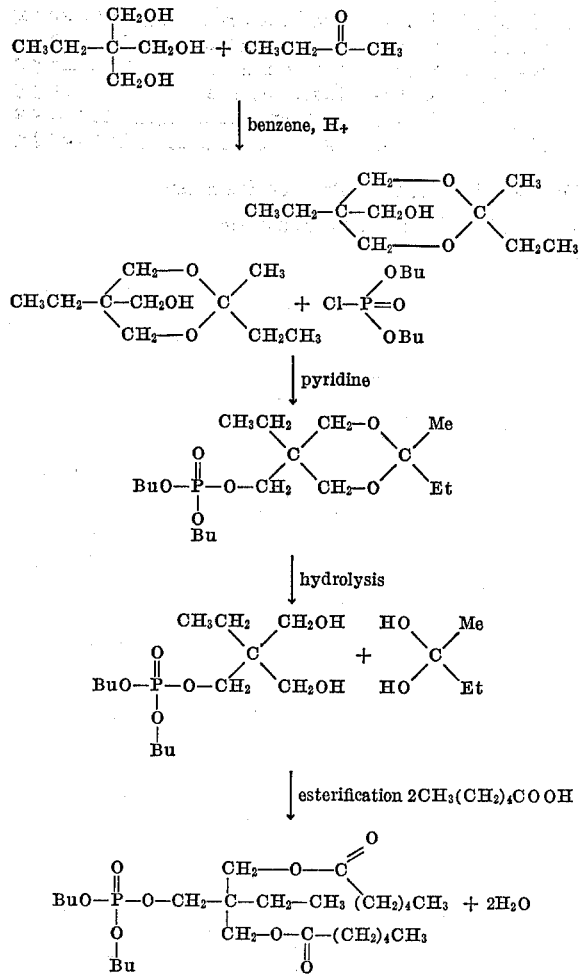

1000 g. of trimethylol propane and 1000 g. of methyl ethyl ketone were reacted together in the presence of 400 g. benzene and 2 g. para toluene sulphonic acid in an agitated vessel equipped with fractionating column. The mixture was refluxed for 12 hours and 1167 g. of methyl ethyl ketal of trimethylol propane were obtained. The yield of water was 144 g. 18.8 g. of this ketal was dissolved in 80 ml. of pyridine and di-butyl chloro phosphate added dropwise (19.8 g. dissolved in CCl$_4$ over half an hour).

323 g. of the P-containing ketal thus formed was treated with 75 ml. H$_2$O containing 0.3 of P-toluene sulphonic acid. About 100 ml. of the distillate (MEK) obtained on heating the reaction mixture were collected. About 150 ml. benzene were then added to the reaction mixture and the distillation continued until the distillate was no longer cloudy.

The product was obtained by refluxing the residue to give 265 g. of glycol phosphate.

265 g. of the glycol phosphate and 190 g. caproic acid were heated to 200° C. in the presence of benzene and a nitrogen bleed to give 316 g. of the desired ester having a phosphorus content of 6.4 wt. percent.

What is claimed is:

1. A lube oil composition comprising a synthetic ester lubricating base oil and a minor, but sufficient amount of, a phosphate ester of a synthetic $C_2$–$C_{20}$ carboxylic acid polyester, to improve the load carrying properties of the ester base oil, said phosphate ester having a formula from the group consisting of

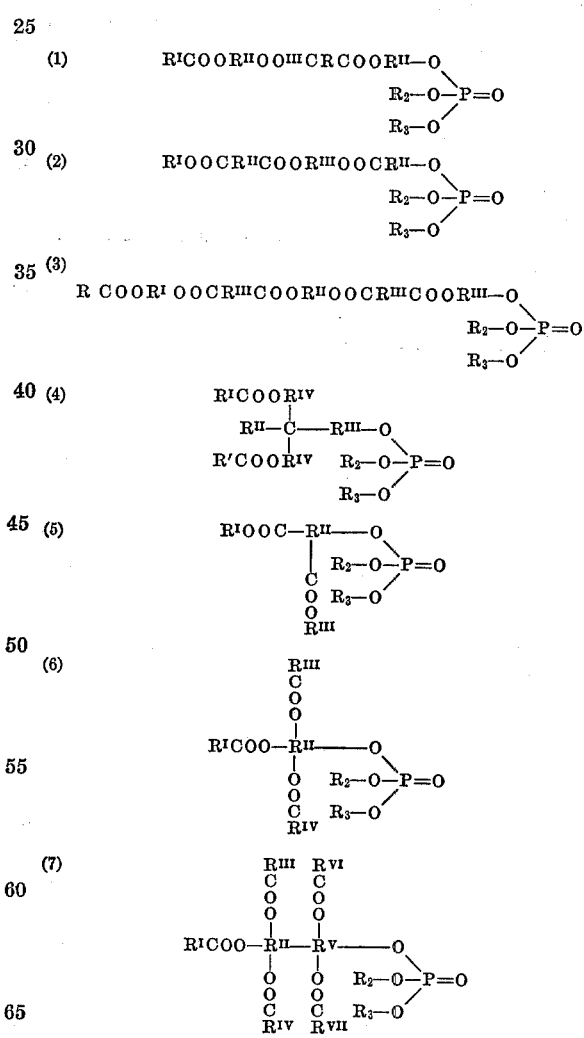

wherein $R^I$ and $R^{VII}$ are the same or different saturated aliphatic hydrocarbyl groups and $R_2$ and $R_3$ are hydrocarbyl groups.

2. A lubricating oil composition as in claim 1 wherein the amount of said phosphate ester is between about 0.001 and about 10.0 wt. percent of the composition.

3. A lubricating oil composition as in claim 1 wherein the composition also contains a minor amount, sufficient to improve load carrying properties, of a dialkyl acid phosphite wherein each alkyl group contains less than 10 carbon atoms.

4. A lubricating oil composition comprising a synthetic ester lubricating base oil and a minor, but sufficient amount of, a phosphate ester of a synthetic $C_2$-$C_{20}$ carboxylic acid polyester, to improve the load carrying properties of the ester base oil, said phosphate ester having the formula:

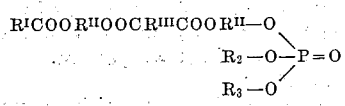

wherein $R^I$, $R^{II}$ and $R^{III}$ are saturated aliphatic hydrocarbyl groups and $R_2$ and $R_3$ are hydrocarbyl groups.

5. A lubricating oil composition as in claim 4 wherein the amount of said phosphate ester is between about 0.001 and about 10.0 wt. percent of the composition.

6. A lubricating oil composition as in claim 4 wherein $R^{III}$ is butylene, $R^{II}$ is neopentylene, $R^I$ is amyl and $R_2$ and $R_3$ are butyl.

7. A lubricating oil composition as in claim 5 wherein $R^{III}$ is butylene, $R^{II}$ is neopentylene, $R^I$ is amyl and $R_2$ and $R_3$ are butyl.

8. A lubricating oil composition as in claim 5 wherein the composition also contains a minor amount, sufficient to improve load carrying properties, of a dialkyl acid phosphite wherein each alkyl group contains less than 10 carbon atoms.

9. A lubricating oil composition comprising a synthetic ester lubricating base oil and a minor, but sufficient amount of, a phosphate ester of a synthetic $C_2$-$C_{20}$ carboxylic acid polyester to improve the load carrying properties of the ester base oil, said phosphate ester having the formula:

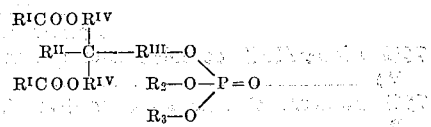

wherein $R^I$, $R^{II}$, $R^{III}$, and $R^{IV}$ are the same or different saturated aliphatic hydrocarbyl groups and $R_2$ and $R_3$ are hydrocarbyl groups.

10. A lubricating oil composition as in claim 9 wherein the amount of said phosphate ester is between about 0.001 and about 10.0 wt. percent of the composition.

11. A lubricating oil composition as in claim 9 wherein $R^I$ is amyl, $R^{II}$ is ethyl, $R^{III}$ and $R^{IV}$ are methylene and $R_2$ and $R_3$ are butyl.

12. A lubricating oil composition as in claim 10 wherein $R^I$ is amyl, $R^{II}$ is ethyl, $R^{III}$ and $R^{IV}$ are methylene and $R_2$ and $R_3$ are butyl.

13. A lubricating oil composition as in claim 10 wherein the composition also contains a minor amount, sufficient to improve load carrying properties, of a dialkyl acid phosphite wherein each alkyl group contains less than 10 carbon atoms.

References Cited

UNITED STATES PATENTS

| | | | |
|---|---|---|---|
| 2,481,372 | 9/1949 | von Fuchs et al. | 252—49.8X |
| 2,643,261 | 6/1953 | Matuszak et al. | 252—49.8X |
| 2,994,408 | 8/1961 | Sorem et al. | 252—49.8X |
| 3,131,151 | 4/1964 | Kerschner et al. | 252—49.8X |
| 3,403,102 | 9/1968 | Le Suer | 252—49.8 |
| 3,423,319 | 1/1969 | Parker et al. | 252—49.8X |

DANIEL E. WYMAN, Primary Examiner

W. J. SHINE, Assistant Examiner

PO-1050
(5/69)

UNITED STATES PATENT OFFICE
CERTIFICATE OF CORRECTION

Patent No. 3,558,491      Dated January 26, 1971

Inventor(s) Benjamin T. Fowler and Eric J. Lewis

It is certified that error appears in the above-identified patent and that said Letters Patent are hereby corrected as shown below:

Column 14, line 26, to read $--R^{I}COOR^{II}OOCR^{III}COOR^{II}-O\diagdown --;$ Column 14, line 43, to read $--R^{I}\overset{|}{C}OOR^{IV} \quad R_{2}-O-\overset{\diagdown}{\underset{\diagup}{P}}=O --;$ and Column 14, line 71, to read --wherein $R^{I}$ to $R^{VII}$ are the same or different saturated ali- --.

Signed and sealed this 24th day of August 1971.

(SEAL)
Attest:

EDWARD M. FLETCHER, JR.
Attesting Officer

WILLIAM E. SCHUYLER, JR.
Commissioner of Patents